United States Patent [19]

Witt

[11] 4,121,050
[45] Oct. 17, 1978

[54] DIFFERENTIAL TRI-PHASE SHIFT KEYED MODULATION

[75] Inventor: Richard P. Witt, Weston, Mass.

[73] Assignee: The United States of America as represented by the Secretary of the Air Force, Washington, D.C.

[21] Appl. No.: 765,026

[22] Filed: Feb. 2, 1977

[51] Int. Cl.² .................................... H04L 27/24
[52] U.S. Cl. .................................. 178/67; 178/69.1
[58] Field of Search ............... 178/67, 69.1; 325/30, 325/45, 320; 329/110, 137, 112; 332/16 R, 22

[56] References Cited

U.S. PATENT DOCUMENTS

| 3,619,503 | 11/1971 | Ragsdale | 325/30 |
|---|---|---|---|
| 3,665,328 | 5/1972 | Widl | 329/110 |
| 3,748,385 | 7/1973 | Okano | 178/67 |
| 3,818,135 | 6/1974 | Tannhauser | 178/67 |
| 3,867,574 | 2/1975 | McIntosh | 178/67 |
| 3,919,653 | 11/1975 | LeMouel | 325/320 |
| 3,944,939 | 3/1976 | LeMouel | 325/320 |
| 3,970,945 | 7/1976 | Knapp | 325/320 |
| 3,983,499 | 9/1976 | Tan | 325/320 |

OTHER PUBLICATIONS

Three-Phase Modulator-Demodulator, D. J. Petrone, pp. 81-83, IBM Technical Disclosure Bulletin, vol. 5, #7, Dec. 1962.

Primary Examiner—Benedict V. Safourek
Assistant Examiner—Michael A. Masinick
Attorney, Agent, or Firm—Joseph E. Rusz; George Fine

[57] ABSTRACT

A differential tri-phase shift keyed modulation system permits both data and data synchronization signals to be transmitted at a single frequency which are then differentiated by phase.

1 Claim, 4 Drawing Figures

DIFFERENTIAL TRI-PHASE SHIFT KEYED MODULATION

STATEMENT OF GOVERNMENT INTEREST

The invention described herein may be manufactured and used by or for the Government for governmental purposes without the payment of any royalty thereon.

BACKGROUND OF THE INVENTION

Many different modulation techniques are available for the transmission of digital data. Among these are differential phase shifted keyed modulation techniques. This invention relates to an improvement in differential phase shift keyed transmission of digital data signals by utilizing three different phases of a carrier frequency signal.

It is an object of this invention to show how both data and data synchronization information may be carried simultaneously in a single signal transmission.

It is also an object of this invention to permit the carrying of uniquely identifiable character or frame synchronization information within the transmitted data stream.

Other objects and advantages of the invention will become apparent from the following description.

It is noted that the invention may be utilized in a digital data modem which provides the interface to a coaxial transmission media of a time division multiple access bus communication system. The modem serves to transmit and receive information by modulating and demodulating the digital data. The tri-phase shift keyed modulation technique incorporated in the modem permits both data and data synchronization signals to be transmitted at a single frequency which are then differentiated by phase as opposed to encryption of the synchronization word.

SUMMARY OF THE INVENTION

A differential tri-phase shift keyed modulation system is provided. A phase splitter is used to obtain three equally spaced phases of an oscillator signal. Switch means responsive to an input data signal selects one of the three phases and applies it to an amplifier for transmission. A receiver/demodulator is utilized and it is comprised of a delay line and phase shifter connected to a phase demodulator for developing a clock synchronizing signal at the data rate. There is also another delay line and a second phase demodulator for detecting the signal data content. Finally, there is utilized a third phase shifter and phase demodulator for detecting a shift of transmission signal phase.

DETAILED DESCRIPTION OF THE PREFERRED EMBODIMENT

Figure 1:
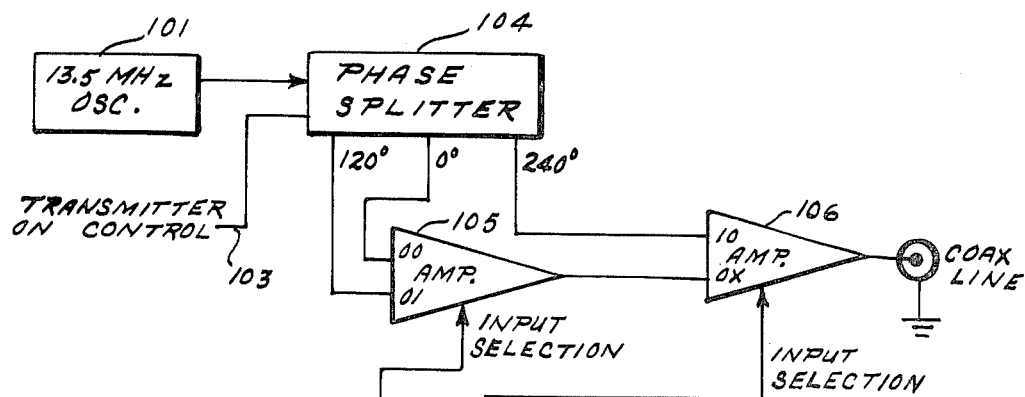
FIG. 1 shows in block form the tri-phase transmission system of the present invention.
Figure 1:
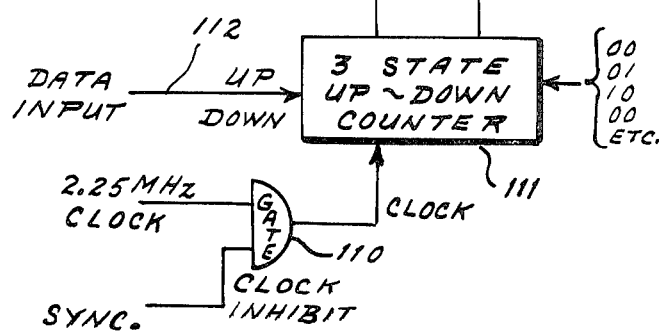
Figure 3:
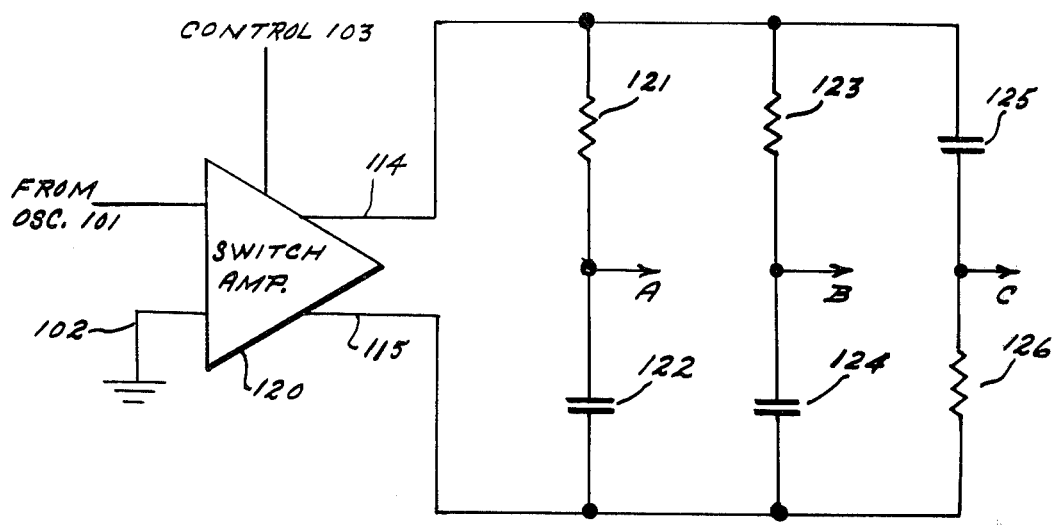
FIG. 3 illustrates the phase splitter utilized in the tri-phase transmission system of FIG. 1.
Figure 4:
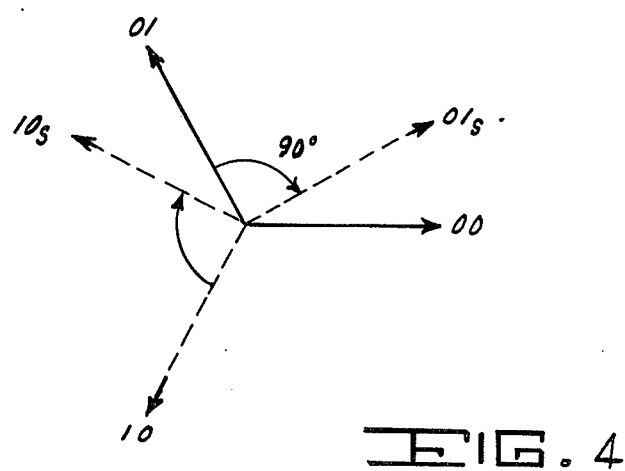
FIG. 4 shows a vector diagram representation of the three outputs of FIG. 3.

In the tri-phase transmitter system, shown in FIG. 1, oscillator source 101 preferably sinusoidal in nature, is utilized as an input to phase splitter 104. Phase splitter 104 has transmitter on/off control 103 comprising switchable connections means. FIG. 3 details phase splitter 104. Switchable amplifier 120 under control 103 selects either oscillator 101 of FIG. 1 for transmission or ground reference 102, when no transmission is required. Amplifier outputs 114 and 115 are, by design, in phase opposition, one to the other. Amplifier 120 may be a commercially available integrated circuit type such as the MC 1545. Three phase splitter outputs A, B, and C are derived from the outputs 104 and 105 through phase shifting means 121 and 122 for signal A, 123 and 124 for signal B and 125 with 126 for signal C. FIG. 4 is a vector diagram representation of these three outputs arbitrarily relabeled 00, 01 and 10. By proper adjustment of resistors 121, 123 and 126 the phase relationship of the three output vectors can be caused to be shifted by 120° for any one vector with respect to any other vector.

Two of said signals may then be used as inputs to switchable amplifier 105 (FIG. 1) and the third as an input to switchable amplifier 106. The output of amplifier 105 may be used as the other input to amplifier 106. Switchable control means consisting of three state up/down counter 111 may then be utilized for selection of the three different signals available from the phase splitter. Three state counter 111 may be formed from a four state counter with appropriate double count up, or double count down gating means causing an immediate count through the 11 state of a four state counter. Counter 111 would operate under the timing control of an input clock pulse which in turn may be inhibited by gate 110. If data input 112 is held in the positive data state the counter will proceed through the sequence 00, 01, 10, 00, 01, etc. If input 112 is held in the negative data state, counter 111 will proceed in the sequence 00, 10, 01, 00, 10, etc. Switchable amplifier 105 will pass input 00 whenever counter 111 outputs is of this value. Likewise, amplifier 105 will pass input signals 01 when counter 111 outputs is of that value. Amplifier 106 will pass input 10 when counter 111 output is of that value. The output of amplifier 105 will be selected and passed by amplifier 106 except when counter 111 is in the 10 state. Thus, amplifier 106 will pass onto a coax cable or radio antenna, or other transmission means, a signal which is selected from the three available signal phases in accordance with the changes of state of data input 112. Amplifier 106 may contain or drive bandpass filter means which is desired to limit the spread of transmission energy outside of what is required for proper reception. Additionally, if data input 112 is interrupted and gate 110 simultaneously interrupts the counter clock input then no change of selected signal phase will occur. In the normal mode of operation each data bit input at 112 will correspond with a phase advance selection or a phase decrement selection depending on whether the input bit is a 1 or 0 state. Periodic frame synchronization indications can be introduced by stopping the data input and inhibiting the clock at gate 110. Amplifier 105 and 106 may be the same as used for amplifier 120.

Figure 2:
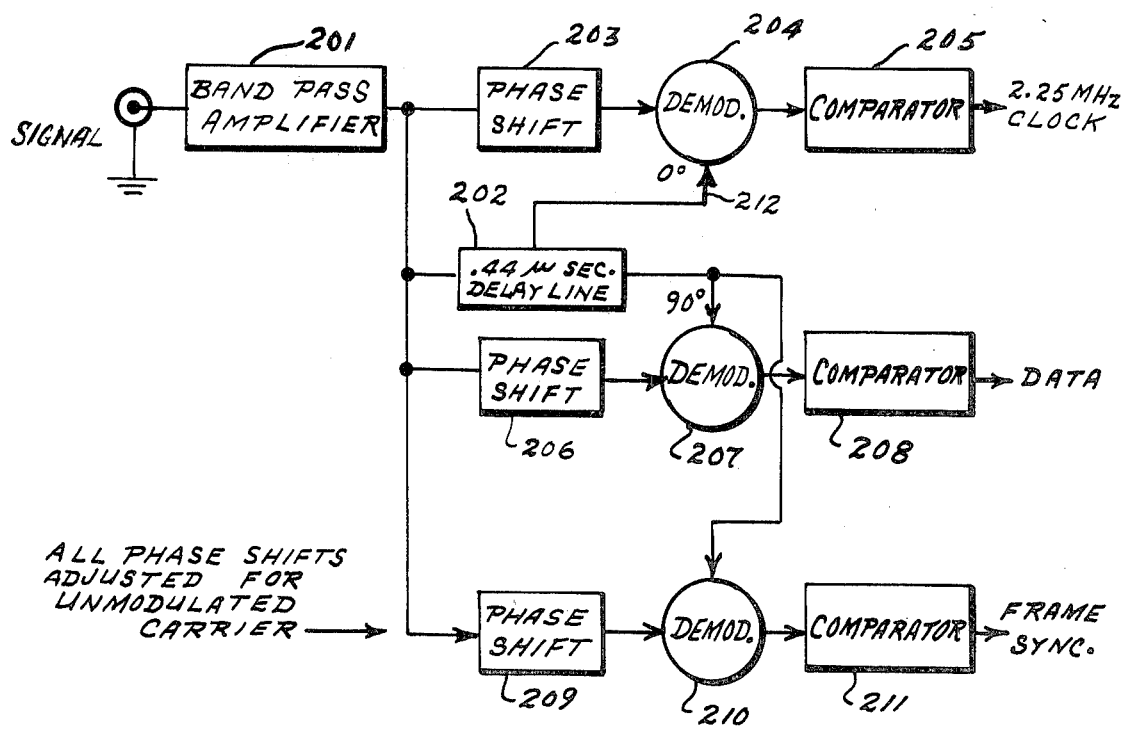
FIG. 2 shows in block diagram form a receiver/demodulator for the tri-phase transmitter.

A receiver/demodulator for the tri-phase transmitter of FIG. 1 is shown in FIG. 2. Input bandpass amplifier 201 may be optionally utilized to improve signal amplitude and to reject unwanted signals from the transmission media. Amplifier 201 drives signal storage means 202 comprising a delay line capable of storing one full bit duration of the transmitted signal modulation. Storage means 202 is centered tapped 212 as shown. Bandpass amplifier 201 is also used to drive phase shifters 203, 206 and 209. Phase demodulator 204 is connected to the output of phase shifter 203 and delay line center tap 212. Phase shift 203 is initially adjusted so that no relative phase shift exists between phase shifter 203's output and input 212 when a continuous unmodulated signal at the frequency of oscillator 101 (FIG. 1) is used to drive the receiver. Comparator 205 is used to amplify and restore an on/off nature to the incident signals. Recalling that in the normal mode the transmitter will advance or retard the selected signal transmission phase by 120° for each input data bit. The operation of demodulator 204 can be seen to be the vector product of each selected signal against each prior signal for the first half bit of the signal duration and then the demodulator product will be vector multiplication of the transmitted signal against itself. These products will first be a negative signal and after the half bit delay will be a positive signal. Comparator 205, with appropriate low pass input filtering, if desired, will convert this phase modulator product sequence into a 50% duty cycle bit rate clock.

Demodulator 207 is fed with phase shifter 206 output and the fully delayed output of delay line 202. Initial adjustment of phase shifter 206 is such as to create a 90° relative phase shift of the modulator inputs when a continuous unmodulated signal at the frequency of oscillator 101 is fed into the receiver. Operation of this demodulator can be visualized from the vector diagram of FIG. 4. Arbitrarily assuming that any previous transmission was a signal with the vector representation 00 then the current bit transmission could be either 01, or 10, in the normal mode of operation. If the present transmission were vector state $01_s$ then the demodulator 207 would output a positive vector product. If, on the other hand, the current transmission were signal 10 phase shifter 206 would present dashed line vector $10_s$ to the demodulator, which would in turn create a negative vector product. By inspection it can be seen that successive transmission selections corresponding to clockwise vector selections will always produce positive demodulator 207 outputs. In a similar fashion successive counter-clockwise selection vector transmission will always produce negative demodulator products. These operations are consistent with the up/down counter 111 (FIG. 1) transmitter phase selection under the control of data input 112. Comparator 208, with appropriate low pass input filtering, if desired, will then convert the output of 207 to an on/off digital signal of approprate amplitude.

The fully delayed output of delay line 202 is also utilized as an input to demodulator 210 along with the output from phase shifter 209. Phase shifter 209 is initially adjusted for 0° relative demodulator input phase shift when the receiver is fed from a continuous unmodulated input at the frequency of oscillator 101. In the normal mode of operation 210 will output the vector product of the current signal transmission and the previous bit period transmission. Inasmuch as these signals will always be in a 120° phase relationship this product will always be negative, in the normal mode of operation. In the unusual mode, where the data and the clock input to counter 111 is interrupted, for a bit period, the continuation of the previous phase of signal transmission will permit the demodulation of the current signal and the previous signal to be in phase and the demodulated product to be positive. Thus, demodulator 210 uniquely detects the frame synchronization signal caused by an interruption in the data transmission process.

The invention is not limited to particular amplifiers, phase shifters or other elements but may be built with different well known elements in accord with these descriptions, in order to fit particular needs, without departing from the scope of the invention.

What is claimed is:

1. In a differential tri-phased shift keyed modulation system a phase comparator for the detection of data transmission shift keyed modulation comprising a signal receiving source, a center tapped delay line having a total storage duration equal to the system transmission signalling rate, a first phase shifter, said delay line and said first phase shifter being fed from said signal receiving source, a first phase demodulator being fed simultaneously by the center tap of said delay line and by said first phase shifter wherein said first phase demodulator develops a clock synchronizing signal at the system data rate, a second phase shifter driven by said signal receiving source, a second phase demodulator receiving the outputs of said delay line and said second phase shifter for the detection of the received signal data content, a third phase shifter driven by said signal receiving source, and a third demodulator, said third phase demodulator being driven by said delay line and said third phase shifter and adjusted to detect pauses occuring in the shifting of transmission signal phase.

* * * * *